United States Patent
Bisheh Niasar et al.

(10) Patent No.: US 12,381,742 B2
(45) Date of Patent: Aug. 5, 2025

(54) SIDE CHANNEL ATTACK RESISTANT CRYPTOGRAPHIC ACCELERATOR

(71) Applicant: Microsoft Technology Licensing, LLC, Redmond, WA (US)

(72) Inventors: Mojtaba Bisheh Niasar, Durham, NH (US); Bharat S. Pillilli, El Dorado Hills, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 18/358,764

(22) Filed: Jul. 25, 2023

(65) Prior Publication Data
US 2025/0038995 A1    Jan. 30, 2025

(51) Int. Cl.
*H04L 9/32* (2006.01)
*H04L 9/00* (2022.01)
*H04L 9/08* (2006.01)

(52) U.S. Cl.
CPC ............ *H04L 9/3252* (2013.01); *H04L 9/002* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 2006/0029220 A1* | 2/2006 | Ibrahim | ................ | H04L 9/3093 380/28 |
| 2006/0098814 A1* | 5/2006 | Al-Khoraidly | ....... | H04L 9/3247 380/28 |
| 2009/0214023 A1* | 8/2009 | Al-Somani | ............. | H04L 9/003 380/28 |
| 2012/0008780 A1* | 1/2012 | Al-Somani | ............. | G06F 7/725 380/255 |
| 2016/0087802 A1* | 3/2016 | Peeters | ................... | G06F 7/725 713/176 |
| 2019/0007219 A1* | 1/2019 | Ghosh | ................... | H04L 9/3252 |

OTHER PUBLICATIONS

International Search Report and Written Opinion received for PCT Application No. PCT/US2024/036295, Oct. 22, 2024, 14 pages.
Niasar, et al., "Area-Time Efficient Hardware Architecture for Signature Based on Ed448", IEEE Transactions on circuits and systems, vol. 68, Issue No. 8, Aug. 2021, pp. 2942-2946.

(Continued)

*Primary Examiner* — Trang T Doan
(74) *Attorney, Agent, or Firm* — Schwegman Lundberg & Woessner, P.A.

(57) ABSTRACT

A computer implemented method includes receiving data on which to perform elliptic curve digital signature algorithm (ECDSA) and mapping ECDSA computations from affine coordinates to projective coordinates. A complete addition formula is executed on the data with operations changing based on bits of a secret key by minimizing execution time and power consumption differences via a finite adder. Modular multiplications are executed via a finite multiplier module. At least one countermeasure selected from the group consisting of randomizing a base point, generating a secret key using a two random number seed random number generator, using a randomized secret key to generate a signature, and randomizing signature generation is executed.

18 Claims, 3 Drawing Sheets

(56) References Cited

OTHER PUBLICATIONS

Niasar, et al., "Efficient Hardware Implementations for Elliptic Curve Cryptography over Curve448", Springer, Dec. 8, 2020, pp. 228-247.
Niasar, et al., "Fast, Small, and Area-Time Efficient Architectures for Key-Exchange on Curve25519", accessed on link http://eprint.iacr.org/2020/797.pdf, vol. 20200627:185636, Jun. 26, 2020, 8 pages.
Tran, et al., "Improved Deterministic Usage of the Elliptic Curve Digital Signature Algorithm with Scrypt", IEEE, Statistical Singal Processing Workshop, Jul. 2, 2023, pp. 611-615.

* cited by examiner

SIDE CHANNEL ATTACK RESISTANT CRYPTOGRAPHIC ACCELERATOR

BACKGROUND

Encryption or signing of digital information utilizes a secret key consisting of a number of bits of data. NISTp256 (National Institute of Science and Technology) utilizes keys consisting of 256 bits, NISTp384 utilizes keys consisting of 384 bits, and NISTp521 utilizes keys consisting of 521 bits. The number of bits is sometimes referred to as "field sizes". Each bit of the key may be a one or a zero. Creating a digital signature for a particular file of digital information includes performing many calculations that are different depending on whether a given bit of the key is a one or a zero.

This difference in calculations can be exploited in what is called a side channel attack (SCA). SCAs involve measuring observable information as the calculations are performed. Timing information may reveal that when each bit of the secret key is a zero, calculations take a different amount of time than when the bit is a one. A differential power analysis (DPA) may reveal that hardware implementing the calculations draws different amounts of power depending on whether the bit of the secret key is a zero or a one. DPA or electromagnetic information may also be used to help reveal the secret key.

Current countermeasures used to reduce the risk of a successful attack increase the amount of time for operations and may include security holes.

SUMMARY

A computer implemented method includes receiving data on which to perform elliptic curve digital signature algorithm (ECDSA) and mapping ECDSA computations from affine coordinates to projective coordinates. A complete addition formula is executed on the data with operations changing based on bits of a secret key by minimizing execution time and power consumption differences via a finite adder. Modular multiplications are executed via a finite multiplier module. At least one countermeasure selected from the group consisting of randomizing a base point, generating a secret key using a two random number seed random number generator, using a randomized secret key to generate a signature, and randomizing signature generation is executed.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Cryptographic implementations utilize a secret key (sometimes called a "private key") that is generated (e.g., randomly generated) to perform operations to produce a signature for a file of information, such as a message a user wishes to send. A receiver of the file and the signature can use a public key to verify the signature is valid, which means that the file was signed by the user. The public key is generated based on the secret key.

Cryptographic implementations may use an elliptic curve digital signature algorithm (ECDSA) for generating keys (e.g., public and private keys) and signing files. ECDSA is a Digital Signature Algorithm (DSA) which uses keys derived from elliptic curve cryptography (ECC). ECDSA is an efficient equation based on public key cryptography (PKC) and may be implemented on a field programmable gate array (FPGA). ECDSA implementations have been vulnerable to Side-Channel Analysis (SCA) attacks.

SCA uses some observable information from a device running an algorithm based on bit values in the private key (sometimes referred to herein as a "secret key") to perform cryptographic operations, such as generating a secret key, generating the public key based on the secret key, and signing data files using the secret key. The observations that may be gathered as the algorithm iterates over the secret key bit values include timing information, simple power analysis (SPA), differential power analysis (DPA), or electromagnetic information (e.g., frequency, voltage value, current value, resistance value, power value, or the like). The observations may be analyzed to reveal the secret key by correlating the observations to bit values of the secret key.

Countermeasures aim to reduce the correlation between the secret key and the side-channel measurement at the cost of adding resource/latency overhead.

The present inventive subject matter utilizes an improved implementation of ECDSA. The improved implementation is a scalable hardware implementation in prime fields over NIST (National Institute of Science and Technology) recommended field sizes. The implementation is configurable to be resistant against DPA attacks by enabling multiple embedded countermeasures.

A unified hardware architecture includes physical protection against SCA in hardware submodules to perform secure key generation, secure signature generation, and secure signature verification.

Modifications to an implementation of the ECDSA algorithm and specific added countermeasures are used to provide an improved implementation of the ECDSA algorithm.

SCA countermeasure improvements allow a tradeoff between resource utilization and performance to implement an efficient NIST primes implementation of ECDSA from different optimization perspectives.

Algorithmic Level improvements include one or more of the following:

A first algorithmic method includes the use of complete addition formulas. Complete addition formulas are utilized to enhance security of the ECDSA architecture. Optimized point addition formulas correctly compute the sum of any two points on any odd order elliptic curve. Performing the same formula for point doubling and point addition operations in an ECDSA algorithm helps prevent side-channel attacks on elliptic curve systems by ensuring all the operations for different values of bits in the secret key take a similar amount of time and a similar amount of power consumed.

A second algorithmic method includes mapping a required computation from affine to projective coordinates to apply randomization/inversion efficiently. The projective coordinates may be obtained via a matrix operation to show how perceived objects change when the viewpoint of the observer changes. This transformation allows creating perspective distortion. An affine transformation is used for scaling, skewing and rotation. In ECC, computations are normally performed using affine coordinates. Affine coordinates are a conventional way of expressing elliptic curve points with the use of two coordinates, x and y. For a pair of constants a and b, an elliptic curve is defined by the set of all points (x,y) that satisfy the equation $y^2=x^3+ax+b$.

By converting the coordinates to projective coordinates, addition formulas, like the complete addition formula can be applied over the projective coordinates to accelerate the computation, reducing the number of required multiplications.

In the projective form, each elliptic curve point will have three coordinates, like (X,Y,Z), with the restriction that Z is never zero. Converting from affine to projective coordinates is performed by: (x,y)→(xZ,yZ), for any non-zero z, such as 1. Mapping back to affine coordinates may be performed by (X,Y,Z)→(X/Z,Y/Z), as long as Z is non-zero.

A third algorithmic method includes utilizing a Montgomery Ladder to perform one point addition and one point doubling in each iteration. The Montgomery Ladder is inherently resistant against SPA attacks since it is a secret-independent implementation. The Montgomery Ladder is a method of computing scalar multiples of points on a broad class of elliptic curves.

A fourth algorithmic method includes performing inversion using Modular Inversion (mod p, mod q) based on Fermat's little theorem (FLT), where p and q are prime numbers. Modular arithmetic is a system of arithmetic for integers, where numbers "wrap around" when reaching a certain value, called the modulus. FLT states that if p is a prime number, then for any integer a, the number $a^p$—a is an integer multiple of p. $a^p \equiv a$ (mod p). Special Case: If "a" is not divisible by "p", Fermat's little theorem is equivalent to the statement that $a^{p-1}-1$ is an integer multiple of p. To accelerate the computation, the inversion is implemented by exponentiation by squaring methods with a window size of 3 bits. The implementation also utilizes the same amount of time regardless of secret key value.

A fifth algorithmic method includes implementing a scalable Montgomery Multiplier. The Montgomery Multiplier was first introduced in 1985 to perform fast modular multiplication. The Montgomery Multiplier architecture is parameterized and can be employed for both mod p and mod q operations. The scalability of this architecture enables support of different operand length and radix.

Coordinates making up the signature or the public key are converted back to affine coordinates to provide the public key or signature on a file.

Scalability in operand length can be used to support different NIST prime configurations, e.g., NISTp256, NISTp384, NISTp521.

Scalability in radix enables a trade-off between the required resources and performance.

A sixth algorithmic method relates to generation of the secret key using a random number generator in a manner that is more difficult to predict. Some prior random number generators have published examples of how to predict the next random number to be generated, which allows an attacker to obtain the secret key. In one example, a secure HMAC_DRBG, which is a hash-based message authentication code deterministic random bit generator, and is used to achieve deterministic a ECDSA implementation. The security of general ECDSA is based on the quality of random number generators (RNGs) and how to implement them securely. Nevertheless, deterministic ECDSA employs a HMAC_DRBG to generate a random number in a secretly deterministic way. In one example, a countermeasure is added as described below.

Countermeasure improvements may be implemented in hardware, and include one or more of the following:

A first countermeasure includes the use of constant-time and secret-independent computations. The use of such computations performed via adders and multipliers, such as a Montgomery Ladder are helpful countermeasures against timing and SPA attacks, respectively.

A second countermeasure includes use of a randomized base point and is achieved using the randomized base point in projective coordinates. In a standard ECDSA, the secret key is used as the base point and is expressed in affine coordinates. Randomizing the base point makes it more difficult to derive the secret key, as the secret key itself is not revealed via timing and SPA attacks. In one example, the base point G=(Gx, Gy) in affine coordinates is transformed and randomized to projective coordinates as (X, Y, Z) using a random value λ, generated by the RNG, as follows:

$$X = G_x \times \lambda$$
$$Y = G_y \times \lambda$$
$$Z = \lambda$$

This approach does not have the performance/area overhead since the implementation is variable-base-point implemented.

A third countermeasure improvement includes the use of a randomized secret key, k, referred to as a randomized scalar. Randomization may be achieved by randomizing the scalar k as follows:

$$k_{randomized} = k + rand \times E$$

E is a group order defined by a NIST standard protocol and has the same length as the field size. As an example, E of NISTp384 has 384 bis. The value of rand is a random value this is one-half of the field size, or 192 bits. Randomizing the secret key helps prevent advanced DPA attacks. The randomized key countermeasure extends the Montgomery Ladder iterations over the secret key due to extended length of the secret key, making it more difficult to correlate power-based observations to secret key values.

The randomized secret key countermeasure is achieved at the cost of 50% more latency on scalar multiplication and adding one lightweight block, including one 32*32 multiplier and an accumulator.

The length of rand×E is configurable to have a trade-off between the required protection and performance.

A fourth countermeasure improvement includes generating the secret key using HMAC_DRBG RNG by feeding two inputs, a seed and a nonce which are random values generated by the RNG and having a same length as the secret key. To avoid SCA information leakage during this operation, masking countermeasures are incorporated into the HMAC_DRBG.

Each round of secure hash algorithm (SHA) 512 execution needs 6,432 random bits, and one HMAC operation uses at least 4 rounds of SHA512 operations. Furthermore, each HMAC_DRBG round uses at least 5 rounds of HMAC operations. However, the proposed architecture uses a lightweight LFSR (left shift register) to feed random values resulting in a random lag, providing first-order DPA attack protection with negligible latency and hardware resource overhead, as power observations do not correlate directly with the secret key.

A fifth countermeasure, referred to as a masking countermeasure, is used in signing operations to generate a signature, s. The masking countermeasure proceeds as follows:

$$s = [k^{-1} \times ((h-d) + r \times (privKey - d))] + [k^{-1} \times (d + r \times d)] \bmod n$$

"d" is used to break the computation into two parts that are randomized and is canceled out by the sum of the two parts. "k" is a random number. "r" is part of the signature used when signing a file, with "r,s". "n" is a modulus number. The random numbers, k, and d, serve to randomize calculation of the signature, making attacks less likely to reveal the secret key. The masking countermeasure has a negligible latency overhead compared to total signing latency.

A sixth countermeasure, referred to as masked scalar blinding, is embedded into implementation to protect from attacks against a countermeasure itself of randomizing the secret key, not the scalar multiplication itself. The countermeasure is implemented as follows:

$$k + r \cdot \#E = (k_0 + k_1) + (r_0 + r_1) \cdot \#E = (k_0 + r_0 \cdot \#E) + (k_1 + r_1 \cdot \#E)$$

Figure 1:
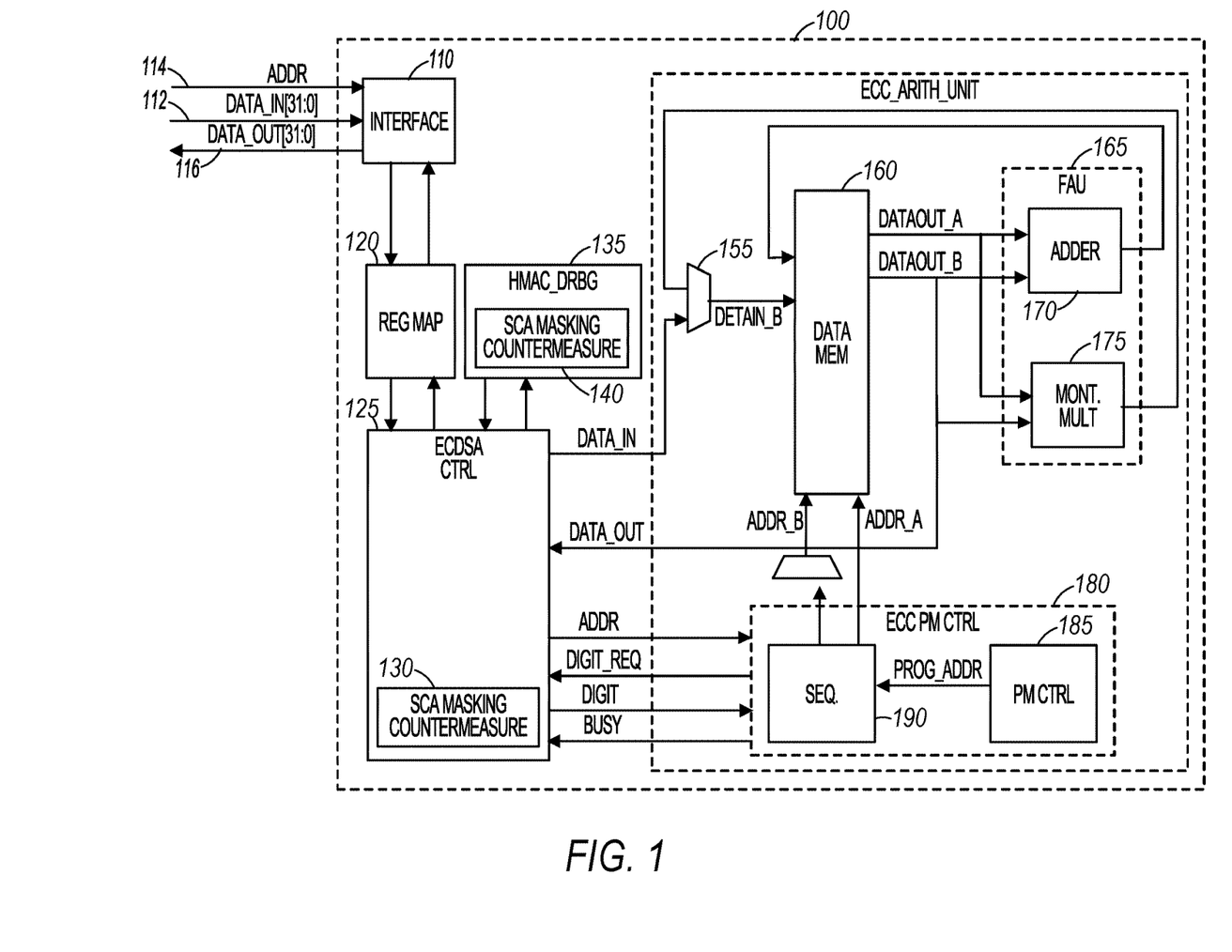
FIG. 1 is a hardware architecture diagram of an improved cryptographic module for executing an elliptic curve digital signature algorithm (ECDSA) improvements and countermeasures according to an example embodiment.

FIG. 1 is a hardware architecture diagram of an improved cryptographic module 100 for executing the ECDSA algorithm improvements and countermeasures. Module 100 in one example may be a field programmable gate array (FPGA), and includes an interface 110 having a data input 112 and address input 114. Interface 110 also includes an output 116, such as a signature for a file that was provided via data input 112. In one example, interface 110 may be an advanced high-performance bus (AHB) interface.

Interface 110 is coupled to a register map 120 and ECDSA controller 125 that includes countermeasures 130. The ECDSA controller 125 provides data and instructions to an RNG 135 that includes SCA masking countermeasures 140. The RNG 135 provides random numbers to the ECDSA controller 125 and the secret key in response to commands from ECDSA controller 125.

ECDSA controller 125 is coupled to an ECC arithmetic unit 150 via a multiplexor 155. ECC arithmetic unit 150 includes a data memory 160, finite arithmetic units 165 that includes an adder 170 and Montgomery multiplier 175. ECC arithmetic unit 150 also includes an ECC controller 180 that includes a PM controller 185 that provides program instructions to a sequencer 190 Sequencer 190 may perform many of the ECDSA operations under control of ECDSA controller 130 as well as control operations of the finite arithmetic units 165.

Figure 2:
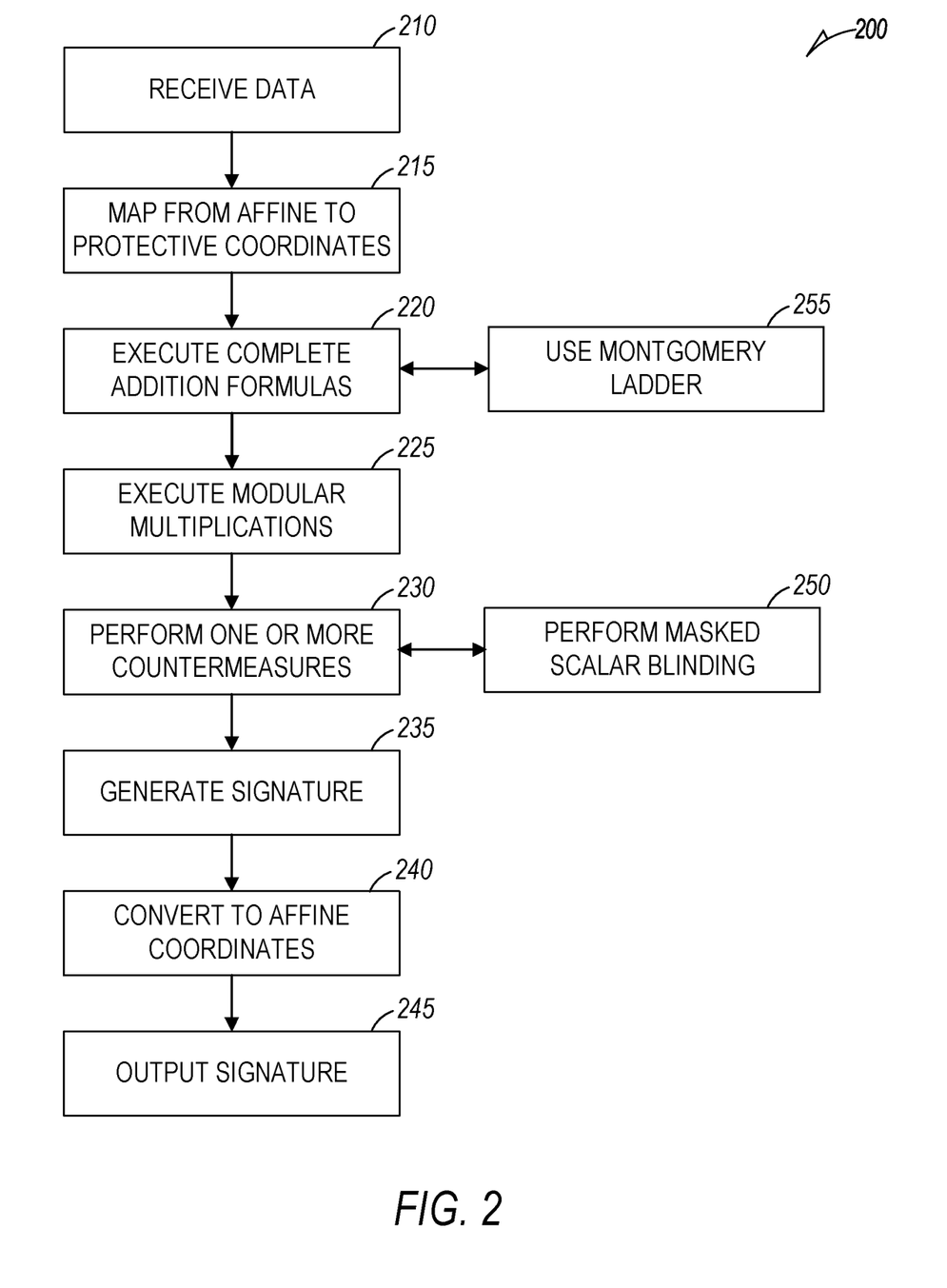
FIG. 2 is a flowchart illustrating a cryptographic device implemented method for performing ECDSA in a secure manner for cryptographic applications according to an example embodiment.

FIG. 2 is a flowchart illustrating a cryptographic device implemented method 200 for performing an elliptic curve digital signature algorithm (ECDSA) in a secure manner for cryptographic applications. The order of operations may be varied in various examples and need not occur in the order shown in FIG. 2. Operations shown may also be optional or configurable in some examples.

Method 200 starts at operation 210 by receiving data on which to perform ECDSA. ECDSA computations are mapped at operation 215 from affine coordinates to projective coordinates. Operation 220 executes complete addition formulas on the data with operations changing based on bits of a secret key to minimize via a finite adder. The use of complete addition formulas helps to minimize execution time and power consumption differences for different values of the secret key bits, making SCA more difficult. Modular multiplications are executed at operation 225 via a finite multiplier module. The finite multiplier module may be a scalable Montgomery Multiplier to perform modular multiplication in one example.

Operation 230 performs at least one countermeasure selected from the group consisting of randomizing a base point, generating a secret key using a two random number seed RNG, using a randomized secret key to generate a signature, and randomizing signature generation.

Method 200 may further include generating a signature in projective coordinates at operation 235 while performing at least one of the countermeasures. At operation 240, the signature is converted back to affine coordinates and provided as an output at operation 245.

In one example, a masked scalar blinding countermeasure is performed at operation 250 to protect from attacks against generating the secret key using a two random number seed RNG. The masked scalar blinding countermeasure is configurable to tradeoff between enhancing protection and enhancing performance. The RNG in one example may be a HMAC_DRBG hardware module.

Operation 255 uses a Montgomery Ladder for ECDSA addition calculations, such as one-point addition and two-point doubling.

In a further example, operation 260 performs modular inversion based on Fermat's little theorem (FLT).

Figure 3:
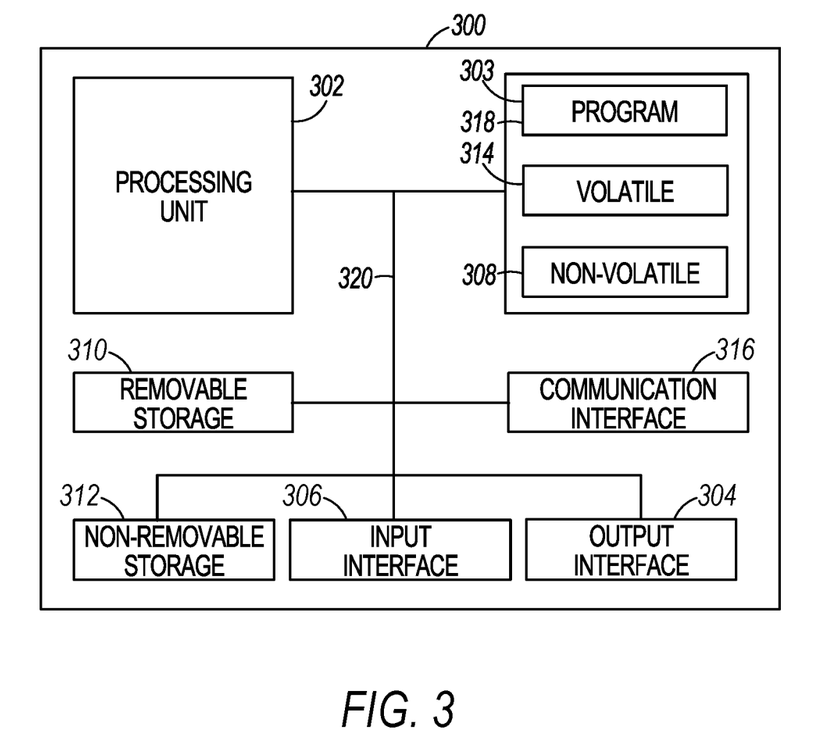
FIG. 3 is a block schematic diagram of a computer system to implement one or more example embodiments.

FIG. 3 is a block schematic diagram of a computer system 300 to perform cryptographic calculations in a secure manner and protect against side channel analysis attacks, and for performing methods and algorithms according to example embodiments. All components need not be used in various embodiments, such as in FPGA FPGA implementation.

One example computing device in the form of a computer 300 may include a processing unit 302, memory 303, removable storage 310, and non-removable storage 312. Although the example computing device is illustrated and described as computer 300, the computing device may be in different forms in different embodiments. For example, the computing device may instead be a smartphone, a tablet, smartwatch, smart storage device (SSD), or other computing device including the same or similar elements as illustrated and described with regard to FIG. 3. Devices, such as smartphones, tablets, and smartwatches, are generally collectively referred to as mobile devices or user equipment.

Although the various data storage elements are illustrated as part of the computer 300, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 300 may include or have access to a computing environment that includes input interface 306, output interface 304, and a communication interface 316. Output interface 304 may include a display device, such as a touchscreen, that also may serve as an input device. The input interface 306 may include one or more of a touchscreen, touchpad, mouse, keyboard, camera, one or more device-specific buttons, one or more sensors integrated within or coupled via wired or wireless data connections to the computer 300, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 300 are connected with a system bus 320.

Computer-readable instructions stored on a computer-readable medium are executable by the processing unit 302 of the computer 300, such as a program 318. The program 318 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 318 along with the workspace manager 322 may be used to cause processing unit 302 to perform one or more methods or algorithms described herein.

EXAMPLES

1. A computer implemented method includes receiving data on which to perform elliptic curve digital signature algorithm (ECDSA) and mapping ECDSA computations from affine coordinates to projective coordinates. A complete addition formula is executed on the data with operations changing based on bits of a secret key by minimizing execution time and power consumption differences via a finite adder. Modular multiplications are executed via a finite multiplier module. At least one countermeasure selected from the group consisting of randomizing a base point, generating a secret key using a two random number seed random number generator, using a randomized secret key to generate a signature, and randomizing signature generation is executed.

2. The method of example 1 and further including generating a cryptographic signature in projective coordinates while performing at least one of the countermeasures, converting the signature to affine coordinates, and providing the signature in affine coordinates as an output.

3. The method of any of examples 1-2 and further including performing a masked scalar blinding countermeasure while generating the secret key using a two random number seed random number generator.

4. The method of example 3 wherein the masked scalar blinding countermeasure is configurable to tradeoff between enhancing protection and enhancing performance.

5. The method of any of examples 1-4 wherein the random number generator includes a HMAC_DRBG hardware module.

6. The method of any of examples 1-5 and further including using a Montgomery Ladder for ECDSA addition calculations.

7. The method of example 6 wherein the Montgomery Ladder is used for one-point addition and two-point doubling.

8. The method of any of examples 1-7 and further including performing modular inversion based on Fermat's little theorem.

9. The method of any of examples 1-8 wherein the finite multiplier module includes a scalable Montgomery Multiplier to perform modular multiplication.

10. A programmable gate array configured to include an interface to receive data on which to perform an elliptic curve digital signature algorithm (ECDSA), a sequencer to map ECDSA computations from affine coordinates to projective coordinates and execute a complete addition formula on the data with operations changing based on bits of a secret key by minimizing execution time differences via a finite adder, a finite multiplier module to execute modular multiplications, and an ECDSA controller and random number generator to perform at least one countermeasure selected from the group consisting of randomizing a base point, generating a secret key using a two random number seed random number generator, using a randomized secret key to generate a signature, and randomizing signature generation.

11. The programmable gate array of example 10 wherein the ECDSA controller is configured to perform a masked scalar blinding countermeasure to protect from attacks against generating the secret key using a two random number seed random number generator.

12. The programmable gate array of example 11 wherein the masked scalar blinding countermeasure is configurable to tradeoff between enhancing protection and enhancing performance.

13. The programmable gate array of any of examples 10-12 wherein the random number generator includes a HMAC_DRBG hardware module.

14. The programmable gate array of any of examples 10-13 and further including using a Montgomery Ladder for ECDSA addition calculations.

15. The programmable gate array of example 14 wherein the Montgomery Ladder is used for one-point addition and two-point doubling.

16. The programmable gate array of example 10 wherein the finite multiplier module includes a scalable Montgomery Multiplier to perform modular multiplication.

17. A device includes a processor and a memory device coupled to the processor and having a program stored thereon for execution by the processor to perform operations. The operations include receiving data on which to perform an elliptic curve digital signature algorithm (ECDSA), mapping ECDSA computations from affine coordinates to projective coordinates, executing a complete addition formula on the data with operations changing based on bits of a secret key by minimizing execution time and power consumption differences via a finite adder, executing modular multiplications via a finite multiplier module, and performing at least one countermeasure selected from the group consisting of randomizing a base point, generating a secret key using a two random number seed random number generator, using a randomized secret key to generate a signature, and randomizing signature generation.

18. The device of example 17 wherein the operations further include generating a cryptographic signature in projective coordinates while performing at least one of the countermeasures, converting the cryptographic signature to affine coordinates, and providing the cryptographic signature in affine coordinates as an output.

19. The device of any of examples 17-18 wherein the operations further include performing a masked scalar blinding countermeasure while generating the secret key using a two random number seed random number generator.

20. The device of any of examples 17-19 wherein the operations further include using a Montgomery Ladder for ECDSA for one-point addition and two-point doubling and wherein the finite multiplier module comprises a scalable Montgomery Multiplier to perform modular multiplication.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving data on which to perform elliptic curve digital signature algorithm (ECDSA);
mapping ECDSA computations from affine coordinates to projective coordinates;
executing a complete addition formula on the data with operations changing based on bits of a secret key by minimizing execution time and power consumption differences via a finite adder;
executing modular multiplications via a finite multiplier module; and
performing at least one countermeasure selected from the group consisting of randomizing a base point, generating a secret key using a two random number seed random number generator, using a randomized secret key to generate a signature in projective coordinates while performing at least one of the countermeasures; converting the signature to affine coordinates; and providing the signature in affine coordinates as an output.

2. The method of claim 1 and further comprising performing a masked scalar blinding countermeasure while generating the secret key using a two random number seed random number generator.

3. The method of claim 2 wherein the masked scalar blinding countermeasure is configurable to tradeoff between enhancing protection and enhancing performance.

4. The method of claim 1 wherein the random number generator comprises a HMAC_DRBG hardware module.

5. The method of claim 1 and further comprising using a Montgomery Ladder for ECDSA addition calculations.

6. The method of claim 5 wherein the Montgomery Ladder is used for one-point addition and two-point doubling.

7. The method of claim 1 and further comprising performing modular inversion based on Fermat's little theorem.

8. The method of claim 1 wherein the finite multiplier module comprises a scalable Montgomery Multiplier to perform modular multiplication.

9. A programmable gate array including:
- an interface to receive data on which to perform an elliptic curve digital signature algorithm (ECDSA);
- a sequencer to map ECDSA computations from affine coordinates to projective coordinates and execute a complete addition formula on the data with operations changing based on bits of a secret key by minimizing execution time differences via a finite adder;
- a finite multiplier module to execute modular multiplications; and
- an ECDSA controller and random number generator to perform at least one countermeasure selected from the group consisting of randomizing a base point, generating a secret key using a two random number seed random number generator, using a randomized secret key to generate a signature in projective coordinates while performing at least one of the countermeasures; converting the signature to affine coordinates; and providing the signature in affine coordinates as an output.

10. The programmable gate array of claim 9 wherein the ECDSA controller is configured to perform a masked scalar blinding countermeasure to protect from attacks against generating the secret key using a two random number seed random number generator.

11. The programmable gate array of claim 10 wherein the masked scalar blinding countermeasure is configurable to tradeoff between enhancing protection and enhancing performance.

12. The programmable gate array of claim 9 wherein the random number generator comprises a HMAC_DRBG hardware module.

13. The programmable gate array of claim 9 and further comprising using a Montgomery Ladder for ECDSA addition calculations.

14. The programmable gate array of claim 13 wherein the Montgomery Ladder is used for one point addition and two point doubling.

15. The programmable gate array of claim 9 wherein the finite multiplier module comprises a scalable Montgomery Multiplier to perform modular multiplication.

16. A device comprising:
- a processor; and
- a memory device coupled to the processor and having a program stored thereon for execution by the processor to perform operations comprising:
  - receiving data on which to perform an elliptic curve digital signature algorithm (ECDSA);
  - mapping ECDSA computations from affine coordinates to projective coordinates;
  - executing a complete addition formula on the data with operations changing based on bits of a secret key by minimizing execution time and power consumption differences via a finite adder;
  - executing modular multiplications via a finite multiplier module; and
- performing at least one countermeasure selected from the group consisting of randomizing a base point, generating a secret key using a two random number seed random number generator, using a randomized secret key to generate a signature
- in projective coordinates while performing at least one of the countermeasures;
  - converting the signature to affine coordinates; and
  - providing the signature in affine coordinates as an output.

17. The device of claim 16 wherein the operations further comprise performing a masked scalar blinding countermeasure while generating the secret key using a two random number seed random number generator.

18. The device of claim 16 wherein the operations further comprise using a Montgomery Ladder for ECDSA for one-point addition and two-point doubling and wherein the finite multiplier module comprises a scalable Montgomery Multiplier to perform modular multiplication.

* * * * *